(12) United States Patent
Sung et al.

(10) Patent No.: US 12,459,859 B2
(45) Date of Patent: Nov. 4, 2025

(54) GLASS ARTICLE AND METHOD FOR MANUFACTURING THE SAME

(71) Applicant: Samsung Display Co., LTD., Yongin-si (KR)

(72) Inventors: Su Jin Sung, Hwaseong-si (KR); Byung Hoon Kang, Hwaseong-si (KR); Seung Kim, Seongnam-si (KR); Young Ok Park, Hwaseong-si (KR); Gyu In Shim, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/412,320

(22) Filed: Jan. 12, 2024

(65) Prior Publication Data

US 2024/0150234 A1     May 9, 2024

Related U.S. Application Data

(62) Division of application No. 16/926,488, filed on Jul. 10, 2020, now Pat. No. 11,912,613.

(30) Foreign Application Priority Data

Dec. 17, 2019 (KR) .................. 10-2019-0169013

(51) Int. Cl.
*B32B 15/04* (2006.01)
*B32B 17/06* (2006.01)
(Continued)

(52) U.S. Cl.
CPC ............ *C03C 21/002* (2013.01); *C03B 27/03* (2013.01); *C03C 3/083* (2013.01);
(Continued)

(58) Field of Classification Search
CPC ...................................... C03C 21/002
(Continued)

(56) References Cited

U.S. PATENT DOCUMENTS 8,561,429 B2    10/2013  Allan et al.
9,718,727 B2 *   8/2017  Bookbinder .......... C03C 23/007
(Continued)

FOREIGN PATENT DOCUMENTS

CN      109415250 A    3/2019
JP     2003137606 A    5/2003
(Continued)

OTHER PUBLICATIONS

Chinese Office Action—Chinese Application No. 202011469159.X dated Nov. 14, 2023, citing references listed within.

*Primary Examiner* — Lauren R Colgan
(74) *Attorney, Agent, or Firm* — CANTOR COLBURN LLP

(57) ABSTRACT

A glass article includes lithium aluminosilicate, includes a first surface, a second surface opposed to the first surface, a first compressive region extending from the first surface to a first compression depth, a second compressive region extending from the second surface to a second compression depth, and, a tensile region disposed between the first compression depth and the second compression depth, where a stress profile of the first compressive region has a first local minimum point at which the stress profile is convex downward and a first local maximum point at which the stress profile is convex upward, where a depth of the first local maximum point is greater than a depth of the first local minimum point, and where a stress of the first local maximum point is greater than a compressive stress of the first local minimum point.

4 Claims, 15 Drawing Sheets

(51) Int. Cl.
*C03B 27/03* (2006.01)
*C03C 3/083* (2006.01)
*C03C 21/00* (2006.01)
*G02F 1/1333* (2006.01)
*C03C 3/04* (2006.01)
*C03C 3/085* (2006.01)

(52) U.S. Cl.
CPC .. *G02F 1/133308* (2013.01); *G02F 1/133331* (2021.01); *C03C 3/04* (2013.01); *C03C 3/085* (2013.01)

(58) Field of Classification Search
USPC .................................................. 428/410, 426
See application file for complete search history.

(56) References Cited

U.S. PATENT DOCUMENTS

| | | | |
|---|---|---|---|
| 10,442,730 B2* | 10/2019 | Allan | C03C 4/18 |
| 10,611,681 B2 | 4/2020 | Dejneka et al. | |
| 11,021,393 B2 | 6/2021 | Oram et al. | |
| 11,028,013 B2 | 6/2021 | Ozeki et al. | |
| 11,034,614 B2 | 6/2021 | Allan et al. | |
| 11,059,744 B2* | 7/2021 | Oram | G06F 1/1656 |
| 11,079,309 B2 | 8/2021 | Morey et al. | |
| 11,123,959 B2 | 9/2021 | Golyatin et al. | |
| 11,267,228 B2* | 3/2022 | DeMartino | H05K 5/03 |
| 11,613,103 B2 | 3/2023 | Demartino et al. | |
| 11,639,308 B2 | 5/2023 | Imakita et al. | |
| 11,820,701 B2 | 11/2023 | Allan et al. | |
| 2010/0009154 A1* | 1/2010 | Allan | C03C 3/093 501/67 |
| 2013/0224492 A1* | 8/2013 | Bookbinder | C03C 21/002 65/30.14 |
| 2015/0030834 A1* | 1/2015 | Morey | G01N 3/30 73/12.06 |
| 2015/0147574 A1 | 5/2015 | Allan et al. | |
| 2016/0122240 A1* | 5/2016 | Oram | C03C 21/002 501/63 |
| 2017/0022092 A1* | 1/2017 | DeMartino | G06F 1/1656 |
| 2017/0158556 A1* | 6/2017 | Dejneka | G06F 1/1637 |
| 2017/0355640 A1* | 12/2017 | Oram | C03C 4/18 |
| 2019/0352225 A1 | 11/2019 | Harris et al. | |
| 2021/0047237 A1 | 2/2021 | Schneider et al. | |
| 2021/0323862 A1 | 10/2021 | Kanehara et al. | |
| 2022/0289625 A1 | 9/2022 | Kanehara et al. | |
| 2023/0234885 A1 | 7/2023 | Imakita et al. | |
| 2024/0190761 A1 | 6/2024 | Imakita et al. | |

FOREIGN PATENT DOCUMENTS

| | | |
|---|---|---|
| JP | 2011527661 A | 11/2011 |
| KR | 1020110036828 | 4/2011 |
| KR | 1020160089487 | 7/2016 |
| KR | 1020170015876 | 2/2017 |
| KR | 1020170036067 | 3/2017 |
| KR | 1020180098473 | 9/2018 |
| KR | 1020190020028 A | 2/2019 |
| KR | 1020190034709 | 4/2019 |
| WO | 2010005578 A1 | 1/2010 |
| WO | 2015077179 A1 | 5/2015 |
| WO | 2019004124 A1 | 1/2019 |
| WO | 2019147733 A1 | 8/2019 |

* cited by examiner

GLASS ARTICLE AND METHOD FOR MANUFACTURING THE SAME

This application is a divisional of U.S. patent application Ser. No. 16/926,488, filed on Jul. 10, 2020, which claims priority to Korean Patent Application No. 10-2019-0169013, filed on Dec. 17, 2019, and all the benefits accruing therefrom under 35 U.S.C. § 119, the content of which in its entirety is herein incorporated by reference.

BACKGROUND

1. Field

Exemplary embodiments of the invention relate to a glass article and a method for manufacturing the same.

2. Description of the Related Art

Glass articles are widely used in electronic devices including display devices or construction materials. A glass article is applied to a substrate of a flat panel display device such as an organic light emitting diode ("OLED") display, a micro-LED display, a nano-LED display, a quantum dot light emitting display, a liquid crystal display, a plasma display, a field emission display, an electrophoretic display and an electrowetting display, or to a window which protects the substrate.

As portable electronic devices such as smart phones and tablet personal computers ("PCs") become popular, glass articles applied to the portable electronic devices are frequently exposed to external impacts. Accordingly, it is desirable to apply a glass article which is thin for portability of such electronic devices and has good strength to withstand external impacts.

SUMMARY

Exemplary embodiments of the invention provide a method for manufacturing a glass article having good strength.

Exemplary embodiments of the invention also provide a glass article having good strength.

However, features of the invention are not restricted to those set forth herein. The above and other features of the invention will become more apparent to one of ordinary skill in the art to which the invention pertains by referencing the detailed description of the invention given below.

An exemplary embodiment of a glass article includes lithium aluminosilicate includes a first surface, a second surface opposed to the first surface, a first compressive region extending from the first surface to a first compression depth, a second compressive region extending from the second surface to a second compression depth, and a tensile region disposed between the first compression depth and the second compression depth, where a stress profile of the first compressive region has a first local minimum point at which the stress profile is convex downward and a first local maximum point at which the stress profile is convex upward, where a depth of the first local maximum point is greater than a depth of the first local minimum point, and where a stress of the first local maximum point is greater than a compressive stress of the first local minimum point.

Another exemplary embodiment of a glass article includes lithium aluminosilicate includes a first surface, a second surface opposed to the first surface, a first compressive region extending from the first surface to a first compression depth, a second compressive region extending from the second surface to a second compression depth, and a tensile region disposed between the first compression depth and the second compression depth, where a stress profile of the first compressive region includes a crack prevention zone including a peak, the crack prevention zone being disposed in a depth range of 30 micrometers ($\mu m$) to 70 $\mu m$.

An exemplary embodiment of a method for manufacturing a glass article includes providing LAS-based glass, immersing the LAS-based glass in first mixed molten salt, immersing the LAS-based glass, which has been immersed in the first mixed molten salt, in second mixed molten salt, immersing the LAS-based glass, which has been immersed in the second mixed molten salt, in third mixed molten salt, and immersing the LAS-based glass, which has been immersed in the third mixed molten salt, in fourth mixed molten salt, where each of the first mixed molten salt to the fourth mixed molten salt includes sodium ions and potassium ions, where a proportion of the sodium ions in cations of the mixed molten salt is larger in an order of the third mixed molten salt, the first mixed molten salt, the second mixed molten salt and the fourth mixed molten salt, and where a proportion of the potassium ions in cations of the mixed molten salt is larger in an order of the fourth mixed molten salt, the second mixed molten salt, the first mixed molten salt and the third mixed molten salt.

The glass article in an exemplary embodiment may have high strength such that it is not easily broken by an external impact.

In an exemplary embodiment of the method for manufacturing a glass article, it is possible to provide a glass article having high strength such that it is not easily broken by an external impact.

The effects of the invention are not limited to the aforementioned effects, and various other effects are included in the specification.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
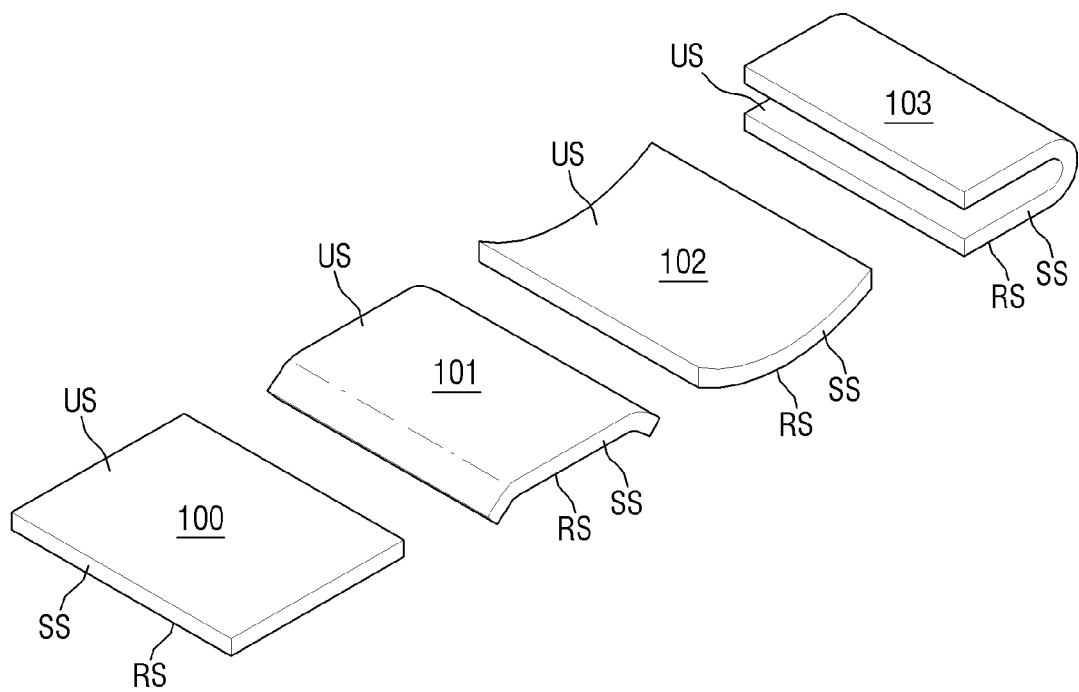
FIG. 1 is a perspective view of an exemplary embodiment of a glass article.

Exemplary embodiments of the invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. If the device in the drawing figures is turned over, elements described as "below" or "beneath" other elements or features would then be oriented "above" the other elements or features, for example. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

The same reference numbers indicate the same components throughout the specification.

As used herein, the term "glass article" refers to an article made entirely or partially of glass.

Exemplary embodiments of the invention will hereinafter be described with reference to the accompanying drawings.

FIG. 1 is a perspective view of an exemplary embodiment of a glass article.

Glass is used as a cover window for protecting a display, a substrate for a display panel, a substrate for a touch panel, an optical member such as a light guide plate and the like in electronic devices including a display, such as a tablet personal computer ("PC"), a notebook PC, a smart phone, an electronic book, a television and a PC monitor as well as a refrigerator and a cleaning machine including a display screen. Glass may also be employed as a cover glass for a dashboard of a vehicle, a cover glass for solar cells, interior materials for construction materials, windows for buildings and houses, and the like.

Some glass articles are desired to have high strength. When glass is employed as a window, for example, it is desirable to have a small thickness to meet the requirements of high transmittance and lightweightness, and also have strength such that it is not easily broken by an external impact. Strengthened glass may be produced by, for example, chemical strengthening or thermal strengthening. Examples of strengthened glass having various shapes are shown in FIG. 1.

Referring to FIG. 1, in an exemplary embodiment, a glass article 100 (hereinafter, also referred to as "cover window") may have a flat sheet shape or a flat plate shape. In another exemplary embodiment, glass articles 101, 102 and 103 may have a three-dimensional shape including bent portions. In an exemplary embodiment, the edges of the flat portion may be bent (e.g., the glass article 101), or the flat portion may be entirely curved (e.g., the glass article 102) or folded (e.g., the glass article 103), for example. The glass articles 101, 102 and 103 may include a first surface US, a second surface RS and side surfaces SS.

The planar shape of the glass articles 100 to 103 may be a rectangular shape, but is not limited thereto, and may have various shapes such as a rectangular shape with rounded corners, a square shape, a circular shape, and an elliptical shape. In the following embodiment, a flat plate having a rectangular planar shape is described as an example of the glass articles 100 to 103, but the invention is not limited thereto.

Figure 2:
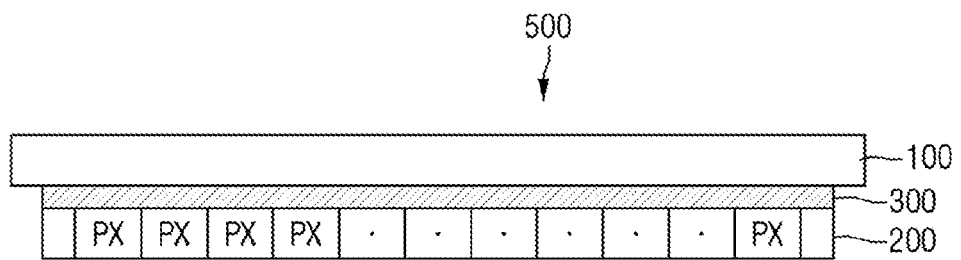
FIG. 2 is a cross-sectional view illustrating an exemplary embodiment in which a glass article is applied to a cover window of a display device.

FIG. 2 is a cross-sectional view illustrating an exemplary embodiment in which a glass article is applied to a cover window of a display device.

Referring to FIG. 2, a display device 500 may include a display panel 200, a cover window 100 disposed on the display panel 200, and an optically transparent bonding layer 300 disposed between the display panel 200 and the cover window 100 to bond the display panel 200 and the cover window 100 to each other.

Examples of the display panel 200 may include not only a self-luminous display panel such as an organic light emitting diode ("OLED") display panel, an inorganic electroluminescence ("EL") display panel, a quantum dot ("QED") display panel, a micro-LED display panel, a nano-LED display panel, a plasma display panel ("PDP"), a field emission display ("FED") panel and a cathode ray tube ("CRT") display panel, but also a light receiving display panel such as a liquid crystal display ("LCD") panel and an electrophoretic display ("EPD") panel.

The display panel 200 includes a plurality of pixels PX and may display an image by light emitted from each pixel PX. The display device 500 may further include a touch member (not shown). In an exemplary embodiment, the touch member may be embedded in the display panel 200. In an exemplary embodiment, since the touch member is directly disposed on a display member of the display panel 200, the display panel 200 itself may perform a touch function, for example. In another exemplary embodiment, the touch member may be manufactured separately from the display panel 200 and then attached to the top surface of the display panel 200 by an optically transparent bonding layer.

The cover window 100 is disposed on the display panel 200. The cover window 100 serves to protect the display panel 200. The strengthened glass article 100 may be applied to a main body of the cover window 100. Since the cover window 100 is larger in size than the display panel 200, the side surface thereof may protrude outward from the side surface of the display panel 200, but it is not limited thereto. The cover window 100 may further include a print layer disposed on at least one surface of the glass article 100 at an edge portion of the glass article 100. The print layer of the cover window 100 may prevent the bezel area of the display device 500 from being visible from the outside, and may perform a decoration function in some cases.

The optically transparent bonding layer 300 is disposed between the display panel 200 and the cover window 100. The optically transparent bonding layer 300 serves to fix the cover window 100 onto the display panel 200. The optically transparent bonding layer 300 may include an optically clear adhesive ("OCA"), an optically clear resin ("OCR"), or the like, for example.

Hereinafter, the strengthened glass article 100 will be described in more detail.

Figure 3:
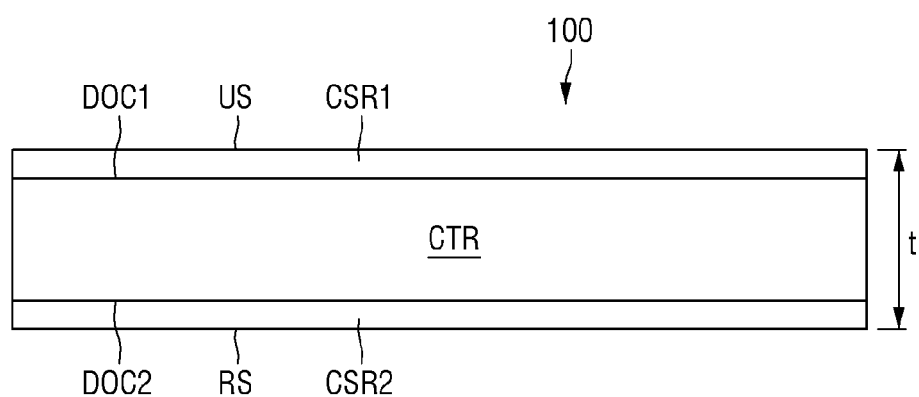
FIG. 3 is a cross-sectional view of an exemplary embodiment of a glass article having a flat plate shape.

FIG. 3 is a cross-sectional view of an exemplary embodiment of a glass article having a flat plate shape.

Referring to FIG. 3, the glass article 100 may include a first surface US, a second surface RS and a side surface SS (refer to FIG. 1). In the glass article 100 having a flat plate shape, the first surface US and the second surface RS are main surfaces having a large area, and the side surface is an outer surface connecting the first surface US with the second surface RS.

The first surface US and the second surface RS are opposed to each other in the thickness direction. When the glass article 100 serves to transmit light in the same manner as the cover window 100 of a display, the light may be mainly incident on one of the first surface US and the second surface RS and pass through the other one.

A thickness t of the glass article 100 is defined as a distance between the first surface US and the second surface RS. The thickness t of the glass article 100 may range, but is not limited to, from 0.1 to 2 millimeters (mm), for example. In an exemplary embodiment, the thickness t of the glass article 100 may be about 1.5 mm or less, for example. In another exemplary embodiment, the thickness t of the glass article 100 may be about 1.2 mm or less, for example. In yet another exemplary embodiment, the thickness t of the glass article 100 may be about 1.0 mm or less, for example. In yet another exemplary embodiment, the thickness t of the glass article 100 may be about 0.8 mm or less, for example. In yet another exemplary embodiment, the thickness t of the glass article 100 may be about 0.75 mm or less, for example. In yet another exemplary embodiment, the thickness t of the glass article 100 may be about 0.6 mm or more, for example. In yet another exemplary embodiment, the thickness t of the glass article 100 may be about 0.65 mm or more, for example. In some particular embodiments, the thickness t of the glass article 100 may range from 0.6 mm to 0.8 mm or from 0.65 mm to 0.75 mm, for example. The glass article 100 may have a uniform thickness t, but is not limited thereto and may have a different thickness t for each region.

The glass article 100 may be strengthened to have a predetermined stress profile therein. The strengthened glass article 100 more efficiently prevents generation of cracks, propagation of cracks, breakage and the like due to external impact than the glass article 100 before strengthening. The glass article 100 strengthened by a strengthening process may have a different stress for each region. In an exemplary embodiment, compressive regions CSR1 and CSR2 to which a compressive stress is applied may be disposed in the vicinity of the surface of the glass article 100, i.e., near the first surface US and the second surface RS, and a tension region CTR to which a tensile stress is applied may be disposed inside the glass article 100, for example. A boundary between the compressive region CSR1 or CSR2 and a tensile region CTR may have a stress value of zero. The compressive stress in one compressive region CSR1 or CSR2 may have a different stress value depending on the position (i.e. depth from the surface). Also, the tensile region CTR may have a different stress value depending on the depth from the surface US or RS.

The position of the compressive region CSR1 or CSR2, the stress profile in the compressive region CSR1 or CSR2, the compressive energy of the compressive region CSR1 or CSR2, the tensile energy of the tensile region CTR or the like in the glass article 100 has a great influence on the mechanical properties of the glass article 100 such as the surface strength. A detailed description thereof will be given later.

Hereinafter, the stress profile of the strengthened glass article 100 will be described in detail.

Figure 4:
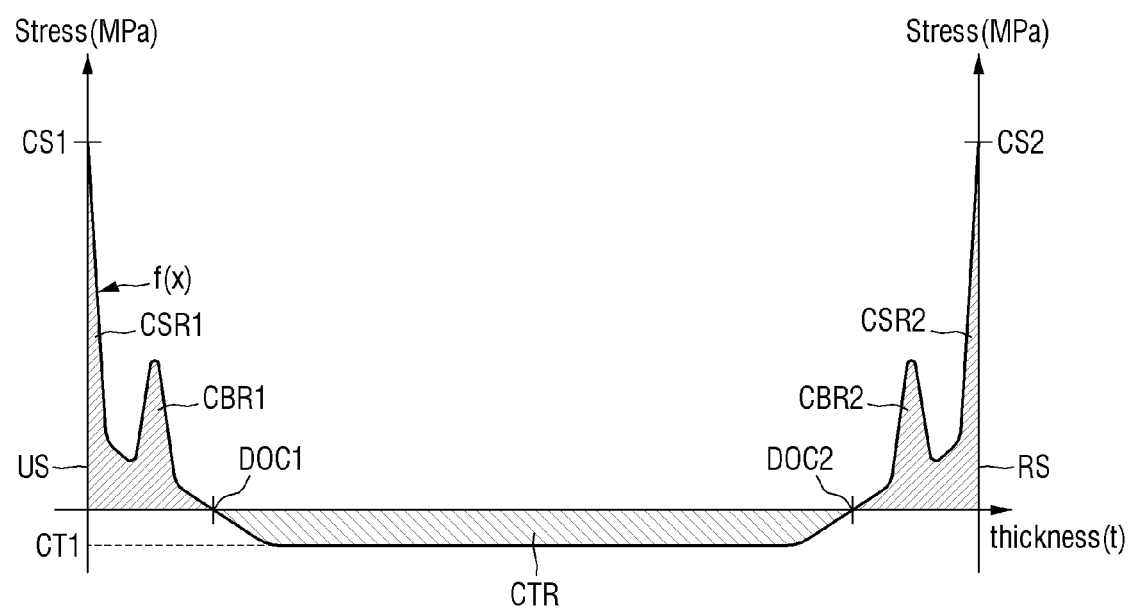
FIG. 4 is a graph showing an exemplary embodiment of a stress profile of a glass article.

FIG. 4 is a graph showing an exemplary embodiment of a stress profile of a glass article. In the graph of FIG. 4, an X-axis represents the thickness direction of the glass article 100. In FIG. 4, the compressive stress has positive values, while the tensile stress has negative values. Herein, the magnitude of the compressive/tensile stress means the magnitude of an absolute value regardless of its sign.

Referring to FIG. 4, the glass article 100 includes a first compressive region CSR1 extending (or expanding) from the first surface US to a first compression depth DOC1, and a second compressive region CSR2 extending (or expanding) from the second surface RS to a second compression depth DOL2. The tensile region CTR is disposed between the first compression depth DOC1 and the second compression depth DOL2. The overall stress profile in the glass article 100 may be symmetrical between both regions of the surfaces US and RS with respect to the center of the direction of the thickness t. Although not shown in FIG. 4, a compressive region and a tensile region may be disposed between opposed side surfaces of the glass article 100 in a similar manner.

The first compressive region CSR1 and the second compressive region CSR2 are resistant to an external impact to prevent the occurrence of cracks or breakage of the glass article 100. As the maximum compressive stresses CS1 and CS2 of the first compressive region CSR1 and the second compressive region CSR2 are larger, the strength of the glass article 100 generally increases. Since an external impact is usually transmitted through the surface of the glass article 100, it is advantageous to have the maximum compressive stresses CS1 and CS2 at the surface of the glass article 100 in terms of durability. From this perspective, the compressive stress of the first compressive region CSR1 and the second compressive region CSR2 tends to be the largest at the surface and generally decreases toward the inside.

The first compressive region CSR1 and the second compressive region CSR2 may include crack prevention zones CBR1 and CBR2 having a higher stress than the surroundings in a predetermined depth section from the first surface US. The stress in the crack prevention zones CBR1 and CBR2 may have a significant effect on a critical drop height of a model drop experiment using the glass article 100. The depth and stress of the crack prevention zones CBR1 and CBR2 will be described later with reference to FIG. 5.

The first compression depth DOC1 and the second compression depth DOC2 suppress cracks or grooves defined in the first surface US and the second surface RS from propagating to the tensile region CTR inside the glass article 100. As the first compression depth DOC1 and the second compression depth DOC2 are larger, it is possible to more efficiently prevent propagation of cracks and the like. The point corresponding to the first compression depth DOC1 and the second compression depth DOC2 corresponds to a boundary between the compressive regions CSR1 and CSR2 and the tension region CTR, and has a stress value of zero.

Throughout the glass article 100, the tensile stress of the tensile region CTR may be balanced with the compressive stress of the compressive regions CSR1 and CSR2. That is, the total compressive stress (i.e., the compressive energy) in the glass article 100 may be the same as the total tensile stress (i.e., the tensile energy) in the glass article 100. The stress energy accumulated in one region having a constant width in the thickness direction in the glass article 100 may be calculated as an integrated value of the stress profile. The following relational expression may be established when the stress profile in the glass article 100 having a thickness t is represented as a function f(x).

$$\int_0^t f(x)dx = 0 \quad \text{[Mathematical Expression 1]}$$

The greater the magnitude of the tensile stress in the glass article 100, the more likely the fragments are to be vigorously released when the glass article 100 is broken, and the more likely the glass article 100 is to be broken from the inside. The maximum tensile stress that meets the frangibility requirements of the glass article 100 may satisfy, but not limited to, the following relationship:

$$CT_1 \leq -38.7 \times \ln(t) + 48.2 \quad \text{[Mathematical Expression 2]}$$

In some exemplary embodiments, the maximum tensile stress $CT_1$ may be 150 MPa or less, or 120 MPa or less. The maximum tensile stress $CT_1$ of 50 MPa or more may be desirable to improve mechanical properties such as strength. In an exemplary embodiment, the maximum tensile stress $CT_1$ may be greater than or equal to 90 MPa and less than or equal to 110 MPa, but is not limited thereto.

The maximum tensile stress $CT_1$ of the glass article 100 may be generally provided at a central portion in the thickness direction of the glass article 100. In an exemplary embodiment, the maximum tensile stress $CT_1$ of the glass article 100 may be provided at a depth in the range of 0.4 t to 0.6 t, or in the range of 0.45 t to 0.55 t, or at a depth of about 0.5 t, for example.

In order to increase the strength of the glass article 100, it is preferable that the compressive stress and the compression depths DOC1 and DOC2 have large values. However, as the compressive energy increases, the tensile energy also increases, and the maximum tensile stress $CT_1$ may increase. In order to meet the fragility requirements while having high strength, it is desirable to adjust the stress profile such that the maximum compressive stresses CS1 and CS2 and the compression depths DOC1 and DOC2 have large values while the compressive energy becomes smaller.

The shape of the stress profile (particularly, the shape of the stress profile in the compressive region) may be precisely controlled through a multistage ion exchange process in which mixed salt and single salt having various salt ratios are alternately applied. In an exemplary embodiment, it may be controlled via a four-stage ion exchange process in which mixed salt and single salt are alternately applied four times. In another exemplary embodiment, it may be controlled via a four-stage ion exchange process in which single salt and mixed salt are alternately applied four times.

Hereinafter, a detailed description of the stress profile of the compressive region will be given with reference to FIG. 4. The following description will focus on the stress profile of the first compressive region CSR1, and since the first compressive region CSR1 and the second compressive region CSR2 have a symmetrical relationship in the stress profile, a repeated description of the stress profile of the second compressive region CSR2 will be omitted or simplified.

Figure 5:
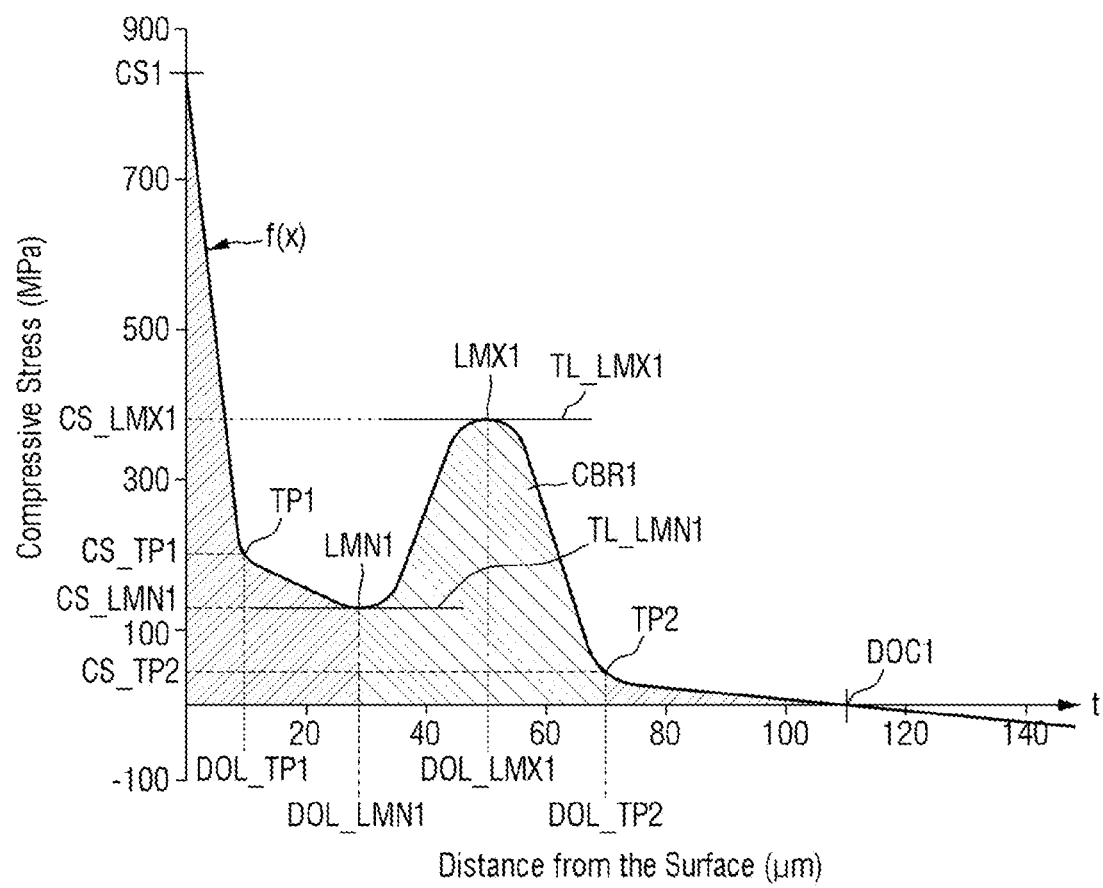
FIG. 5 is an enlarged graph of the vicinity of the first compressive region of FIG. 4.
Figure 6:
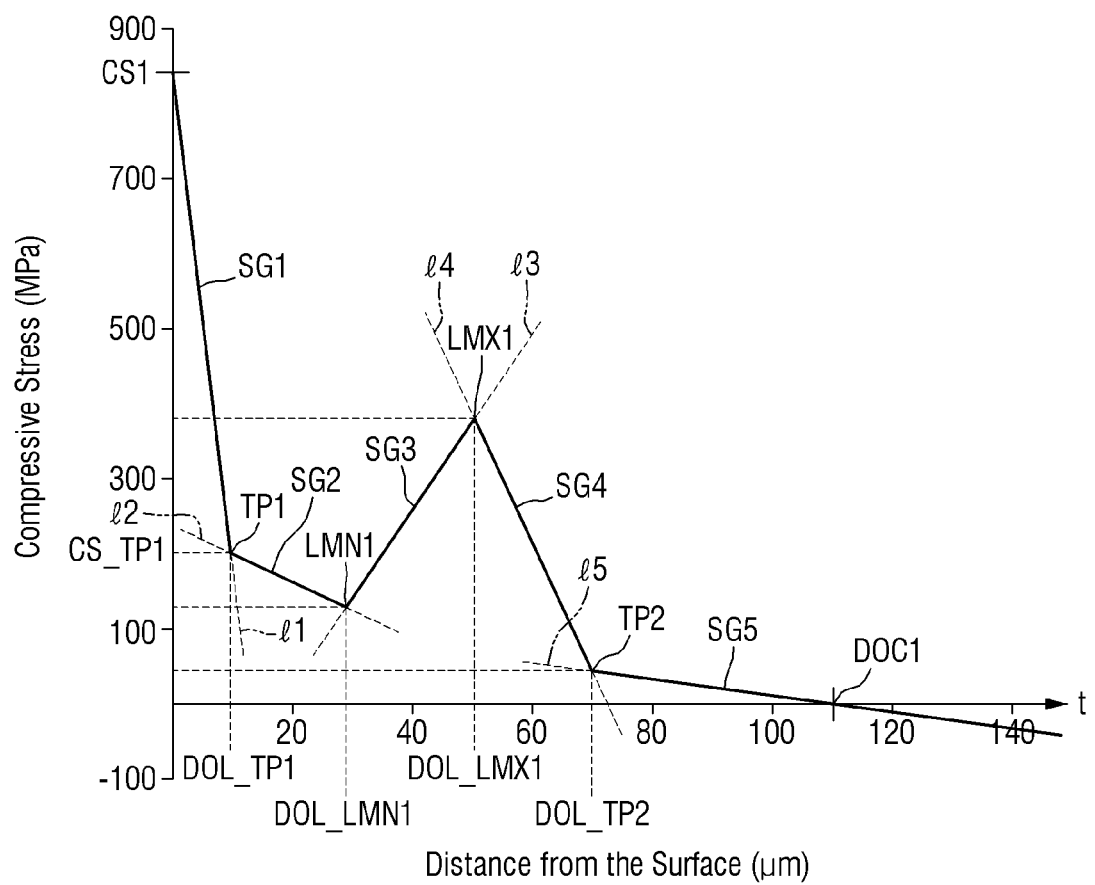
FIG. 6 is a diagram schematically showing a linear graph to which the stress profile of FIG. 5 approximates.

FIG. 5 is an enlarged graph of the vicinity of the first compressive region of FIG. 4. FIG. 6 is a diagram schematically showing a linear graph to which the stress profile of FIG. 5 approximates.

Referring to FIGS. 5 and 6, the stress profile in the first compressive region CSR1 may decrease, increase, and decrease again as it goes from the first surface US to the first compression depth DOC1. In the first compressive region CSR1, the stress profile may include at least two first local minimum point LMN1 and first local maximum point LMX1, each having a tangent line whose slope is zero, and at least two first transition point TP1 and second transition point TP2, each having a rapidly changing slope.

The first local minimum point LMN1 and the first local maximum point LMX1 may be provided between the first surface US and the first compression depth DOC1. The first local minimum point LMN1 may be provided between the first surface US and the first local maximum point LMX1. The first local maximum point LMX1 may be provided between the first local minimum point LMN1 and the first compression depth DOC1. The first transition point TP1 may be provided between the first surface US and the first local minimum point LMN1. The second transition point TP2 may be provided between the first local maximum point LMX1 and the first compression depth DOC1.

In the first compressive region CSR1, the stress profile may decrease from the first surface US to the first local minimum point LMN1 via the first transition point TP1 having a rapidly changing slope, increase from the first local minimum point LMN1 to the first local maximum point LMX1, and decrease from the first local maximum point LMX1 to the first compression depth DOC1 via the second transition point TP2 having a rapidly changing slope.

The stress profile in the first compressive region CSR1 may be divided into first to fifth segments SG1 to SG5. Specifically, the stress profile of the first compressive region CSR1 may include a first segment SG1 extending from the first surface US to the first transition point TP1, a second segment SG2 extending from the first transition point TP1 to the first local minimum point LMN1, a third segment SG3 extending from the first local minimum point LMN1 to the first local maximum point LMX1, a fourth segment SG4 extending from the first local maximum point LMX1 to the second transition point TP2, and a fifth segment SG5 extending from the second transition point TP2 to the first compression depth DOC1.

The stress profile may have, as it goes from the first surface US toward the first compression depth DOC1, a negative average slope in the first segment SG1 and the second segment SG2, a positive average slope in the third segment SG3, and a negative average slope in the fourth segment SG4 and the fifth segment SG5.

The maximum value of the stress in the stress profile may appear at the first surface US. The maximum compressive stress CST may be 300 MPa or more. In various exemplary embodiments, the maximum compressive stress CST may be 350 MPa or more, 400 MPa or more, 450 MPa or more, or 500 MPa or more. In addition, the maximum compressive stress CST may be 2000 MPa or less. In various exemplary embodiments, the maximum compressive stress CST may be 1800 MPa or less, 1500 MPa or less, or 1050 MPa or less. In some exemplary embodiments, the maximum compressive stress CS1 may be in the range of 800 MPa to 900 MPa.

The first transition point TP1 is provided at a point where the first segment SG1 and the second segment SG2 meet, and a tangent line at the first transition point TP1 may have a negative slope. The absolute value of the slope of the tangential line at the first transition point TP1 may be smaller than the absolute value of the average slope of the first segment SG1 and greater than the absolute value of the average slope of the second segment SG2. A stress CS_TP1 at the first transition point TP1 may be smaller than a stress CS_LMX1 at the first local maximum point LMX1 and greater than a stress CS_LMN1 at the first local minimum point LMN1. A depth DOL_TP1 of the first transition point TP1 is in the range of about 5 micrometers ($\mu$m) to about 10 $\mu$m, and the stress CS_TP1 at the first transition point TP1 may have a value in the range of about 180 MPa to about 220 MPa, but the invention is not limited thereto.

The first local minimum point LMN1 may be provided at a point where the second segment SG2 and the third segment SG3 meet, and a tangent line TL_LMN1 at the first local minimum point LMN1 may have a slope of zero. The stress CS_LMN1 at the first local minimum point LMN1 may be smaller than the stress CS_TP1 at the first transition point TP1 and greater than a stress CS_TP2 at the second transition point TP2.

A depth DOL_LMN1 of the first local minimum point LMN1 may have a value ranging from about 0.24 times to about 0.31 times the first compression depth DOC1. Specifically, the depth DOL_LMN1 of the first local minimum point LMN1 may be 20 $\mu$m or more, 25 $\mu$m or more, or 28 $\mu$m or more. In addition, the depth DOL_LMN1 of the first local minimum point LMN1 may be 40 $\mu$m or less, 35 $\mu$m or less, or 32 $\mu$m or less. In an exemplary embodiment, the depth DOL_LMN1 of the first local minimum point LMN1 may have a value ranging from about 28 $\mu$m to about 32 $\mu$m, but is not limited thereto. In the following description with reference to FIG. 7, a case where the depth DOL_LMN1 of the first local minimum point LMN1 is 30 $\mu$m will be described as an example.

The stress CS_LMN1 of the first local minimum point LMN1 may have a value ranging from about 0.12 times to about 0.16 times the stress CS1 at the first surface US. Specifically, the stress CS_LMN1 of the first local minimum point LMN1 may be 100 MPa or more, 110 MPa or more, or 115 MPa or more. In addition, the stress CS_LMN1 of the first local minimum point LMN1 may be 140 MPa or less, 130 MPa or less, or 125 MPa or less. In an exemplary embodiment, the stress CS_LMN1 of the first local minimum point LMN1 may have a value ranging from about 115 MPa to about 125 MPa, but is not limited thereto.

The first local maximum point LMX1 may be provided at a point where the third segment SG3 and the fourth segment SG4 meet, and a tangent line TL_LMX1 at the first local maximum point LMX1 may have a slope of zero. The stress CS_LMX1 at the first local maximum point LMX1 may be smaller than the stress CS1 at the first surface US and greater than the stress CS_TP1 at the first transition point TP1.

A depth DOL_LMX1 of the first local maximum point LMX1 may have a value ranging from about 0.41 times to about 0.50 times the first compression depth DOC1, but is not limited thereto. Specifically, the depth DOL_LMX1 of the first local maximum point LMX1 may be 40 $\mu$m or more, 45 $\mu$m or more, or 48 $\mu$m or more. In addition, the depth DOL_LMX1 of the first local maximum point LMX1 may be 60 $\mu$m or less, 55 $\mu$m or less, or 52 $\mu$m or less. In an exemplary embodiment, the depth DOL_LMX1 of the first local maximum point LMX1 may have a value ranging from about 48 $\mu$m to about 52 $\mu$m, but is not limited thereto. In the following description with reference to FIG. 7, a case where the depth DOL_LMX1 of the first local maximum point LMX1 is 50 $\mu$m will be described as an example.

The stress CS_LMX1 of the first local maximum point LMX1 may be 150 MPa or more, 200 MPa or more, or 250 MPa or more. Further, the stress CS_LMX1 of the first local maximum point LMX1 may be 600 MPa or less, 550 MPa or less, or 500 MPa or less. In an exemplary embodiment, the stress CS_LMX1 of the first local maximum point LMX1 may have a value in the range of about 262.2 MPa to about 481.2 MPa, but is not limited thereto. A more detailed description of the range of the stress CS_LMX1 of the first local maximum point LMX1 will be given later with reference to FIG. 7.

The second transition point TP2 is provided at a point where the fourth segment SG4 and the fifth segment SG5 meet, and a tangent line at the second transition point TP2 may have a negative slope. The absolute value of the slope of the tangent line at the second transition point TP2 may be smaller than the absolute value of the average slope of the fourth segment SG4 and greater than the absolute value of the average slope of the fifth segment SG5. The stress CS_TP2 at the second transition point TP2 may be greater than zero and smaller than the stress CS_LMN1 at the first local minimum point LMN1.

A depth DOL_TP2 of the second transition point TP2 may be 60 $\mu$m or more, 65 $\mu$m or more, or 68 $\mu$m or more. In addition, the depth DOL_TP2 of the second transition point TP2 may be 80 $\mu$m or less, 75 $\mu$m or less, or 72 $\mu$m or less. In an exemplary embodiment, the depth DOL_TP2 of the second transition point TP2 may have a value ranging from about 68 $\mu$m to about 72 $\mu$m, but is not limited thereto. In the following description with reference to FIG. 7, a case where the depth DOL_TP2 of the second transition point TP2 is 70 $\mu$m will be described as an example.

The stress CS_TP2 of the second transition point TP2 may be 30 MPa or more, 35 MPa or more, or 40 MPa or more. Further, the stress CS_TP2 of the second transition point TP2 may be 55 MPa or less, 50 MPa or less, or 45 MPa or less. In an exemplary embodiment, the stress CS_TP2 of the second transition point TP2 may have a value ranging from about 40 MPa to about 45 MPa, but is not limited thereto. In the following description with reference to FIG. 7, a case where the stress CS_TP2 of the second transition point TP2 is 43.1 MPa will be described as an example.

A point where the stress is zero in the stress profile may appear at a point away from the first surface US by the first compression depth DOC1 in the depth direction. The first compression depth DOC1 may have a larger value than the depth DOL_TP2 of the second transition point TP2. In the glass article 100, a section having a depth below the first compression depth DOC1 may be the first compressive region CSR1, and a section having a depth above the first compression depth DOC1 may be the tensile region CTR. The first compression depth DOC1 may be 80 $\mu$m or more. In various exemplary embodiments, the first compression depth DOC1 may be 90 µm or more, 95 µm or more, 100 µm or more, or 105 µm or more. Further, the first compression depth DOC1 may be 130 µm or less, 125 µm or less, 120 µm or less, or 115 µm or less. In some exemplary embodiments, the first compression depth DOC1 may be in the range of 105 µm to 115 µm.

The stress profile of the first compressive region CSR1 may further include a first crack prevention zone CBR1 including a peak. When the compressive stress in the first crack prevention zone CBR1 is large, the occurrence of cracks may be effectively prevented. However, when the stress is excessively large in the first crack prevention zone CBR1, the tensile energy in the glass may increase according to Mathematical Expression 1, which may cause failure in satisfying the frangibility requirements of the glass article 100. Therefore, the stress of the first crack prevention zone CBR1 is preferably adjusted at an appropriate level.

In an exemplary embodiment, the stress profile of the glass article may have the first crack prevention zone CBR1 including one peak. Four ion exchange processes may be involved to form the first crack prevention zone CBR1 including one peak. In another exemplary embodiment, the stress profile of the glass article may have the first crack prevention zone CBR1 including a plurality of peaks. In an exemplary embodiment, six ion exchange processes may be involved to form the first crack prevention zone CBR1 including two peaks, for example. Eight ion exchange processes may be involved to form the first crack prevention zone CBR1 including three peaks, but the number of peaks included in the first crack prevention zone CBR1 is not limited thereto. As a result, '2n+2' ion exchange processes may be involved to form the first crack prevention zone CBR1 including n peaks. In this case, in order to form the first crack prevention zone CBR1, molten salt including sodium ions in a proportion of about 90 mol % or more may be used in the $(2n+1)^{th}$ ion exchange process. Hereinafter, the depth and the stress of the first crack prevention zone CBR1 will be described in more detail.

The depth of the first crack prevention zone CBR1 will be described in conjunction with a model drop experiment using the glass article 100. In the model drop experiment, after dropping a jig model of a smart phone model to which the glass article 100 is applied, when a crack does not occur, the drop was repeated by increasing the height by 5 centimeter (cm). Finally, when a crack has occurred, the height (i.e., the maximum height at which no crack occurred) immediately before the occurrence of the crack was determined as a critical drop height h.

[Mathematical Expression 3]

$$h = \frac{L1*L2*L3*E_{comp}}{6 \text{ mg}} * \sqrt{\frac{CS\_50 + \frac{K_{1C}}{Y*\sqrt{c}}}{\alpha * E_{glass}}}$$

Mathematical Expression 3 represents a relationship between the critical drop height h and various factors affecting the critical drop height h based on the experimental result. As represented in Mathematical Expression 3, the factors affecting the critical drop height h include a horizontal length L1, a vertical length L2, and a height L3 of the jig model, g means gravitational acceleration, Young's modulus $E_{comp}$ of the jig model including glass, a weight m of the jig model, a compressive stress CS_50 at a depth of 50 µm from the surface of a glass sample, fracture toughness $K_{IC}$ of the glass sample, a constant Y according to the crack shape, a crack length c, an extinction coefficient α which is defined as a ratio of bending energy to total kinetic energy, Young's modulus $E_{glass}$ of the glass sample, and the like.

According to Mathematical Expression 3, the stress affecting the critical drop height h may be the compressive stress CS_50 at a depth point of 50 µm from the surface. As described above, since the depth of the crack generated in the glass article 100 has a median of about 50 µm as the experimental result, the stress at the depth point of the crack, i.e., the compressive stress CS_50 at the depth point of about 50 µm from the first surface US may have a significant effect on the critical drop height h. Therefore, in the stress profile, when there is the first crack prevention zone CBR1 having a high stress near the depth point of about 50 µm from the first surface US, the occurrence of cracks may be effectively prevented.

In an exemplary embodiment of the stress profile of the glass article, the first crack prevention zone CBR1 may be defined as a region between the first local minimum point LMN1 and the second transition point TP2 in the stress profile. The first crack prevention zone CBR1 may be a region including the third segment SG3 and the fourth segment SG4. The section of the first crack prevention zone CBR1 may vary according to the positions of the first local minimum point LMN1 and the second transition point TP2. The first crack prevention zone CBR1 may be disposed in the range of about 20 µm to about 80 µm in an exemplary embodiment, may be disposed in the range of about 25 µm to about 75 µm in another exemplary embodiment, and may be disposed in the range of 30 µm to 70 µm in yet another exemplary embodiment, but is not limited thereto. In addition, the first crack prevention zone CBR1 may be disposed in the depth range of about 0.27 times to about 0.64 times the first compression depth DOC1 from the first surface US.

The first crack prevention zone CBR1 may exhibit a stress profile such that the stress increases from the first local minimum point LMN1 to the first local maximum point LMX1, and decreases from the first local maximum point LMX1 to the second transition point TP2. The maximum stress value in the first crack prevention zone CBR1 may be the stress CS_LMX1 at the first local maximum point LMX1. As described above, since the depth DOL_LMX1 of the first local maximum point LMX1 has a value of about 50 µm, the compressive stress CS_50 at a depth of 50 µm from the surface affecting the critical drop height h as shown in Mathematical Expression 3 may refer to the stress CS_LMX1 at the first local maximum point LMX1, but is not limited thereto.

The stress of the first segment SG1 provided relatively near to the first surface US in the first compressive region CSR1 may be mainly determined by the density of potassium ions. The section of the first segment SG1 may also include sodium ions, but the stress of the corresponding section may be mainly dependent on the density of potassium ions having a larger ion size. In the depth section of the first segment SG1, the greater the density of potassium ions, the higher the stress, and the stress profile may substantially approximate to the density profile of potassium ions.

The stress of the second segment SG2 provided inward relative to the first segment SG1 may be mainly determined by the density of sodium ions. That is, in the depth section of the second segment SG2, the greater the density of sodium ions, the higher the stress, and the stress profile may substantially approximate to the density profile of sodium ions.

The stresses of the third segment SG3 and the fourth segment SG4 provided inward relative to the second segment SG2 may be mainly determined by the density of potassium ions. That is, in the depth section of the third segment SG3 and the fourth segment SG4, the greater the density of potassium ions, the higher the stress, and the stress profile may substantially approximate to the density profile of potassium ions. The second transition point TP2 may correspond to the maximum penetration depth of potassium ions.

The stress of the fifth segment SG5 provided inward relative to the fourth segment SG4 may be mainly determined by the density of sodium ions. That is, in the depth section of the fifth segment SG5, the greater the density of sodium ions, the higher the stress, and the stress profile may substantially approximate to the density profile of sodium ions. The first compression depth DOC1 may correspond to the maximum penetration depth of sodium ions.

The first segment SG1 may substantially approximate to a first straight line 11 connecting the coordinates of the first transition point TP1 and the coordinates of the first surface US in the corresponding section. The first straight line 11 may be expressed as a first function in Mathematical Expression 4 below in a coordinate plane with an X-axis indicating depth and a Y-axis indicating stress.

$$y=m_1x+a \qquad \text{[Mathematical Expression 4]}$$

In the first function, $m_1$ is an average slope of the first segment SG1, which is a first slope of the first straight line 11, and a is a y-intercept, which represents the compressive stress CS1 at the first surface US.

The second segment SG2 may substantially approximate to a second straight line 12 connecting the coordinates of the first transition point TP1 and the coordinates of the first local minimum point LMN1 in the corresponding section. The second straight line 12 may be expressed as a second function in Mathematical Expression 5 below in a coordinate plane with an X-axis indicating depth and a Y-axis indicating stress.

$$y=m_2x+b \qquad \text{[Mathematical Expression 5]}$$

In the second function, $m_2$ is an average slope of the second segment SG2, which is a second slope of the second straight line 12, and b represents a y-intercept.

The third segment SG3 may substantially approximate to a third straight line 13 connecting the coordinates of the first local minimum point LMN1 and the coordinates of the first local maximum point LMX1 in the corresponding section. The third straight line 13 may be expressed as a third function in Mathematical Expression 6 below in a coordinate plane with an X-axis indicating depth and a Y-axis indicating stress.

$$y=m_3x+c \qquad \text{[Mathematical Expression 6]}$$

In the third function, $m_3$ is an average slope of the third segment SG3, which is a third slope of the third straight line 13, and c represents a y-intercept.

The fourth segment SG4 may substantially approximate to a fourth straight line 14 connecting the coordinates of the first local maximum point LMX1 and the coordinates of the second transition point TP2 in the corresponding section. The fourth straight line 14 may be expressed as a fourth function in Mathematical Expression 7 below in a coordinate plane with an X-axis indicating depth and a Y-axis indicating stress.

$$y=m_4x+d \qquad \text{[Mathematical Expression 7]}$$

In the fourth function, $m_4$ is an average slope of the fourth segment SG4, which is a fourth slope of the fourth straight line 14, and d represents a y-intercept.

The fifth segment SG5 may substantially approximate to a fifth straight line 15 connecting the coordinates of the second transition point TP2 and the coordinates of the first compression depth DOC1 in the corresponding section. The fifth straight line 15 may be expressed as a fifth function in Mathematical Expression 8 below in a coordinate plane with an X-axis indicating depth and a Y-axis indicating stress.

$$y=m_5x+e \qquad \text{[Mathematical Expression 8]}$$

In the fifth function, $m_5$ is an average slope of the fifth segment SG5, which is a fifth slope of the fifth straight line 15, e represents a y-intercept, and $-e/m^5$ which is an x-intercept represents the first compression depth DOC1. Some sections of the tensile region CTR adjacent to the first compressive region CSR1 may have a stress profile in conformity with the fifth straight line 15.

The first segment SG1 may substantially have the first slope $m_1$, the second segment SG2 may substantially have the second slope $m_2$, the third segment SG3 may substantially have the third slope $m_3$, the fourth segment SG4 may substantially have the fourth slope $m_4$, and the fifth segment SG5 may substantially have the fifth slope $m_5$.

Among the first to fifth slopes $m_1$ to $m_5$ of the above-described functions, each of the first slope $m_1$, the second slope $m_2$, the fourth slope $m_4$, and the fifth slope $m_5$ except the third slope $m_3$ may have a negative value. The third slope $m_3$ may have a positive slope.

The absolute value of the first slope $m_1$ is the largest, followed by the absolute value of the fourth slope $m_4$, the absolute value of the third slope $m_3$, the absolute value of the second slope $m_2$, and the absolute value of the fifth slope $m_5$, sequentially. However, the invention is not limited thereto. In addition, the absolute value of the average slope of the first segment SG1 may be greater than the absolute value of the average slope of the fourth segment SG4, and the absolute value of the average slope of the fourth segment SG4 may be greater than the absolute value of the average slope of the third segment SG3. The absolute value of the average slope of the third segment SG3 may be greater than the absolute value of the average slope of the second segment SG2, and the absolute value of the average slope of the second segment SG2 may be greater than the absolute value of the average slope of the fifth segment SG5.

The first to fifth segments SG1 to SG5 may be generated by a plurality of ion exchange processes. The ion exchange process is a process of exchanging ions in glass with other ions. By performing the ion exchange process, the ions at or near the surface of the glass may be replaced or exchanged with larger ions having the same valence or oxidation state. In an exemplary embodiment, when the glass includes a monovalent alkali metal such as Li+, Na+, K+ and Rb+, the monovalent cation on the surface may be replaced by Na+, K+, Rb+, or Cs+ ions with a larger ionic radius, for example.

As an exemplary embodiment, in a case where sodium ions in the glass are exchanged with potassium ions, for example, when the glass including sodium ions is exposed to potassium ions by, for example, immersing the glass in a molten salt bath including potassium nitrate, sodium ions in the glass are discharged to the outside and the potassium ions may replace them. The exchanged potassium ions generate compressive stress because they have a larger ionic radius than sodium ions. The greater the amount of potassium ions exchanged, the greater the compressive stress.

Since the ion exchange takes place through the surface of the glass, the amount of potassium ions on the glass surface is the greatest. Although some of the exchanged potassium ions may diffuse into the glass to increase the depth of a compressive region, i.e., a compression depth, the amount may generally decreases as being farther from the surface. Thus, the glass may have a stress profile that has the greatest compressive stress on the surface and decreases toward the inside. However, the exemplary embodiments are not limited to the above examples. The stress profile may be modified depending on the temperature, time, a number of times, presence or absence of heat treatment and/or the like of the ion exchange process.

The ion exchange process may be performed four or more times. In an exemplary embodiment, the ion exchange process may include first to fourth ion exchange processes, for example. The first to fourth ion exchange processes may be performed in different baths. Each ion exchange process may be performed simultaneously on a plurality of glasses. That is, by immersing a plurality of glasses in one bath, the ion exchange process may be performed simultaneously on the plurality of glasses. A detailed description of the ion exchange process will be given later with reference to FIGS. 8 to 15.

Figure 7:
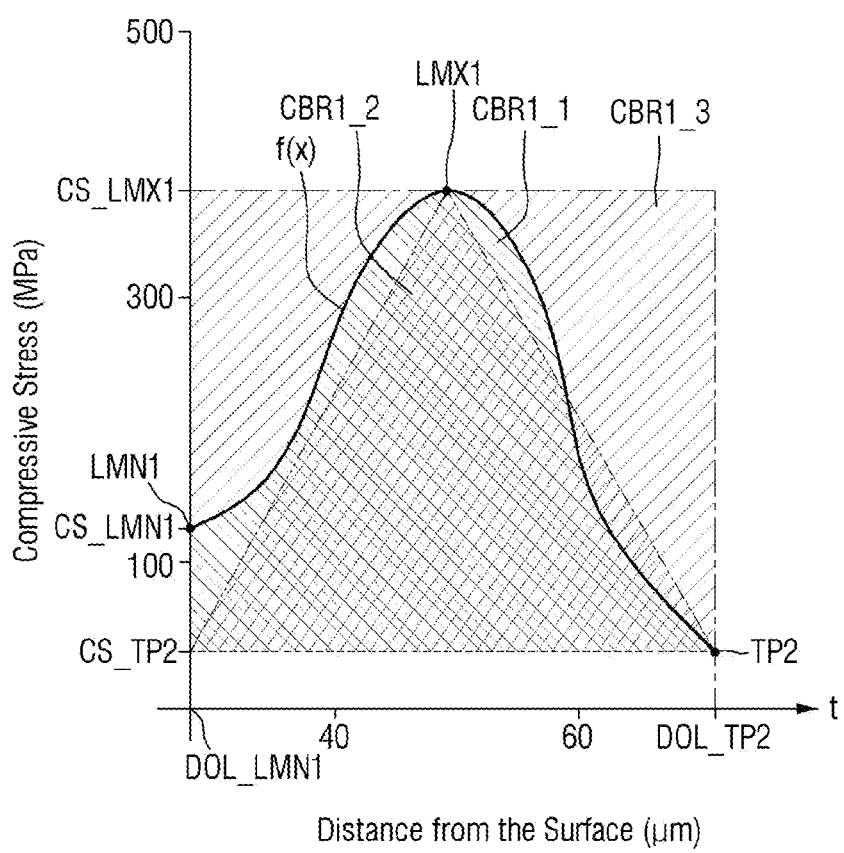
FIG. 7 is an enlarged graph of the vicinity of the first crack prevention zone in FIG. 5.

FIG. 7 is an enlarged graph of the vicinity of the first crack prevention zone in FIG. 5. In order to determine the range of the stress CS_LMX1 of the first local maximum point LMX1, FIG. 7 illustrates, in addition to the first crack prevention zone CBR1, a first crack prevention zone approximation triangle CBR1_2 having, as vertices, the first local maximum point LMX1, the second transition point TP2 and a point of coordinates (DOL_LMN1, CS_TP2) and a first crack prevention zone approximation rectangle CBR1_3 having, as vertices, four points of coordinates (DOL_LMN1, CS_TP2), (DOL_LMN1, CS_LMX1), (DOL_TP2, CS_TP2) and (DOL_TP2, CS_LMX1).

Referring to FIGS. 5 and 7, the range of the stress CS_LMX1 of the first local maximum point LMX1 may be determined on the assumption that the area of the first crack prevention zone CBR1 is larger than the area of the first crack prevention zone approximation triangle CBR1_2 and smaller than the area of the first crack prevention zone approximation rectangle CBR1_3. The area of the first crack prevention zone CBR1 may range from 10000 MPa*μm to 11000 MPa*μm. In an exemplary embodiment, the area of the first crack prevention zone CBR1 may be 10486.1 MPa*μm, but is not limited thereto.

The area of a region CBR1_1 obtained by subtracting a lower portion of the first crack prevention zone CBR1 having a horizontal length of 40 μm and a vertical length of 43.1 MPa from the first crack prevention zone CBR1 may be larger than the area of the first crack prevention zone approximation triangle CBR1_2. Further, a value obtained by subtracting the area of a rectangle having a horizontal length DOL_TP2−DOL_LMN1 (e.g., 40 μm) and a vertical length CS_TP2 (e.g., 43.1 MPa) from the area of the first crack prevention zone CBR1 may be smaller than the area of the first crack prevention zone approximation rectangle CBR1_3. When it is calculated assuming that the area of the first crack prevention zone CBR1 is 10486.1 MPa*μm, the following inequality is derived as shown in Mathematical Expression 9.

$$\tfrac{1}{2} \times 40\ \text{um} \times (CS\_LMX1 - 43.1)\ MPa < (10486.1 - 40 \times 43.1)\ MPa^{*}um < 40\ \text{um} \times (CS\_LMX1 - 43.1)\ MPa \quad \text{[Mathematical Expression 9]}$$

When Mathematical Expression 9 is summarized with respect to the stress CS_LMX1 at the first local maximum point LMX1, the stress CS_LMX1 of the first local maximum point LMX1 may have a value in the range of 262.2 MPa to 481.2 MPa. That is, the maximum stress (or the stress CS_LMX1 at the first local maximum point) of the first crack prevention zone CBR1 may have a value in the range of 262.2 MPa to 481.2 MPa. The stress CS_LMX1 at the first local maximum point may be about 0.32 times to about 0.54 times the stress CS1 at the first surface US.

Therefore, an exemplary embodiment of the glass article 100 may have high strength such that it is not easily broken by an external impact due to the crack prevention zones CBR1 and CBR2 disposed in a predetermined depth section from the first surface US and having a higher stress than the surroundings.

Figure 8:
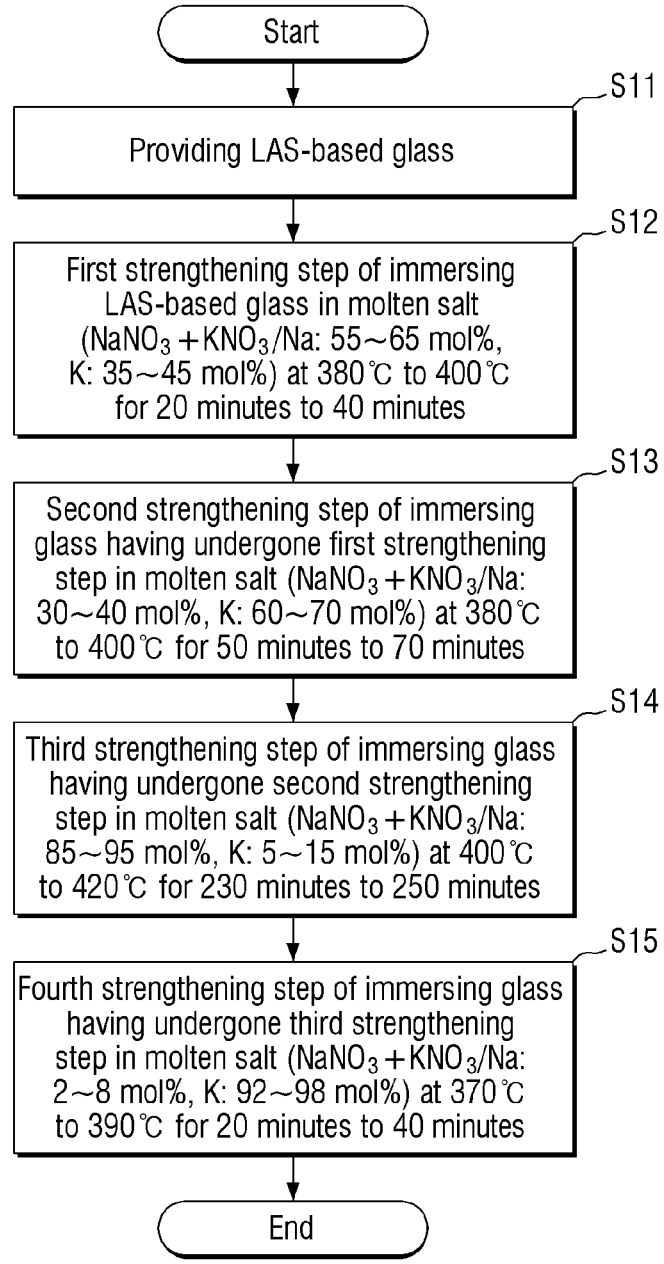
FIG. 8 is a flowchart of an exemplary embodiment of a method for manufacturing a glass article.
Figure 9:
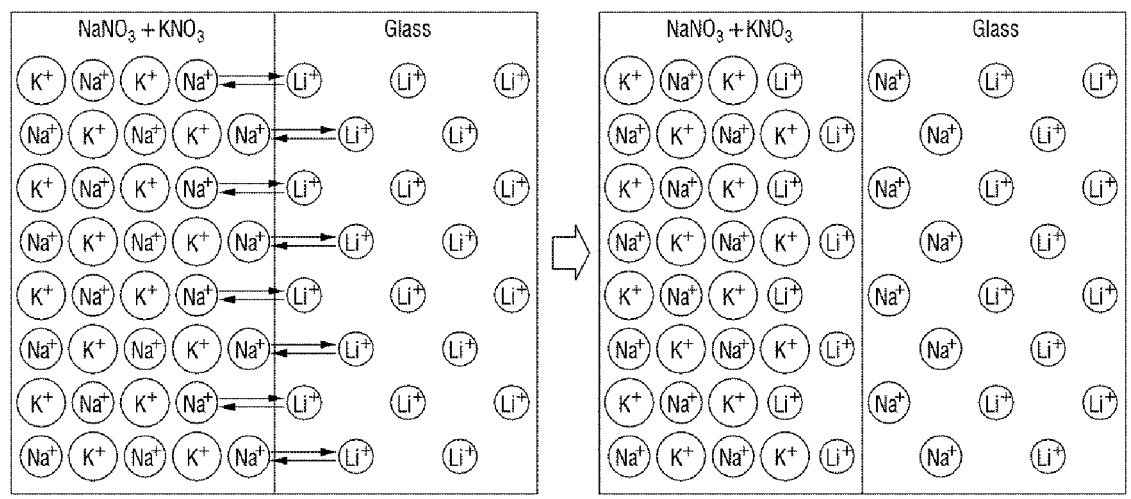
FIG. 9 is a schematic diagram illustrating an exemplary embodiment of an ion exchange process of a first strengthening operation in a method for manufacturing a glass article.
Figure 10:
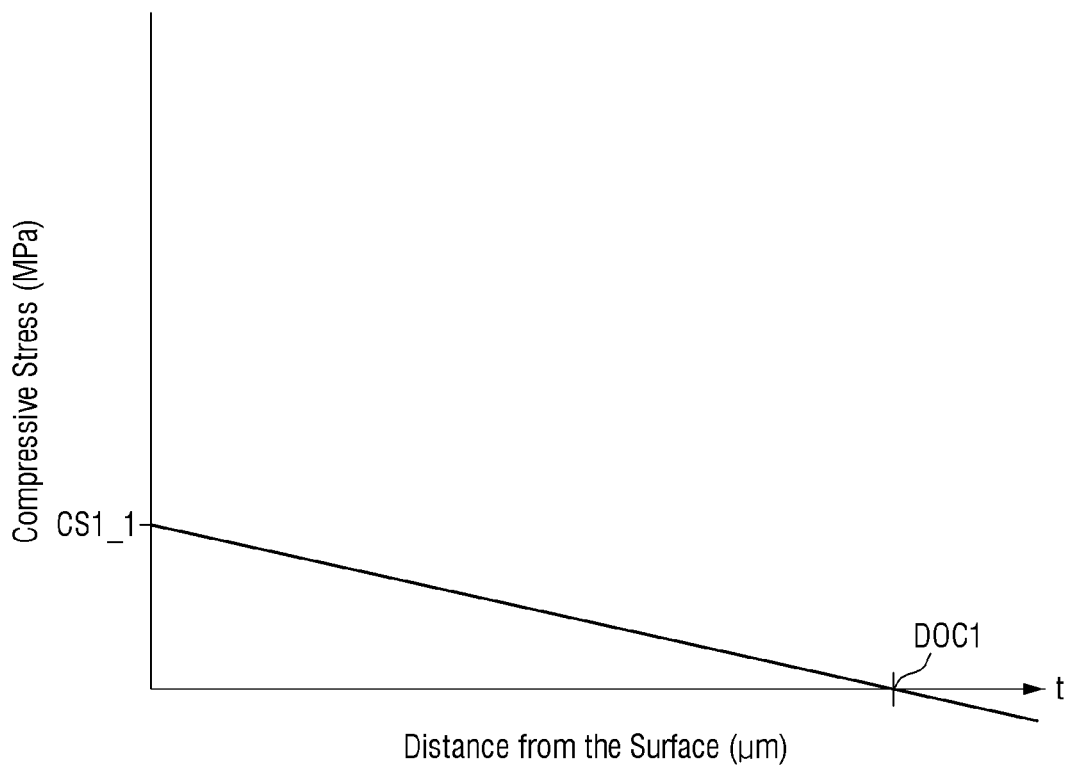
FIG. 10 is a graph showing the stress profile of the glass article that has undergone the first strengthening operation.
Figure 11:
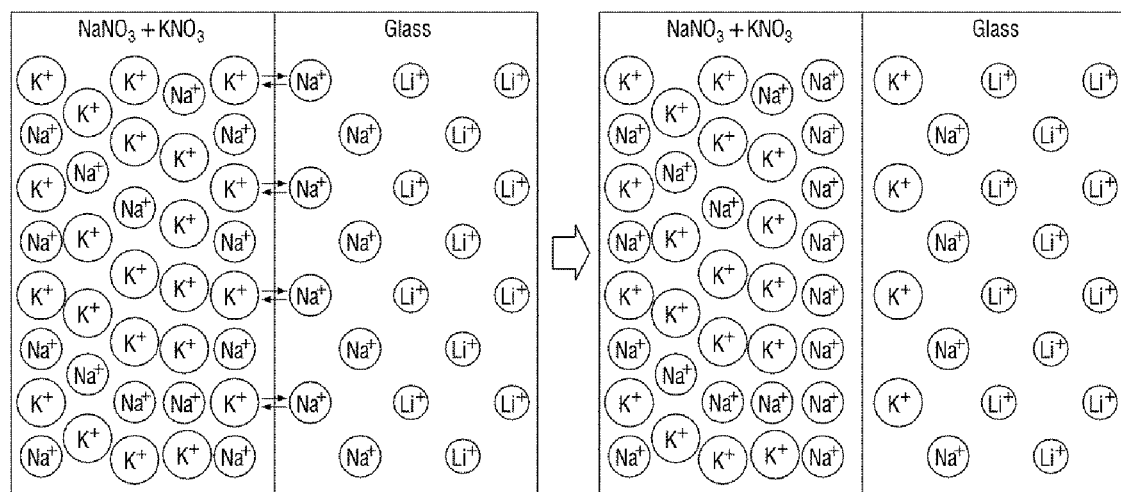
FIG. 11 is a schematic diagram illustrating an exemplary embodiment of an ion exchange process of a second strengthening operation in a method for manufacturing a glass article.
Figure 12:
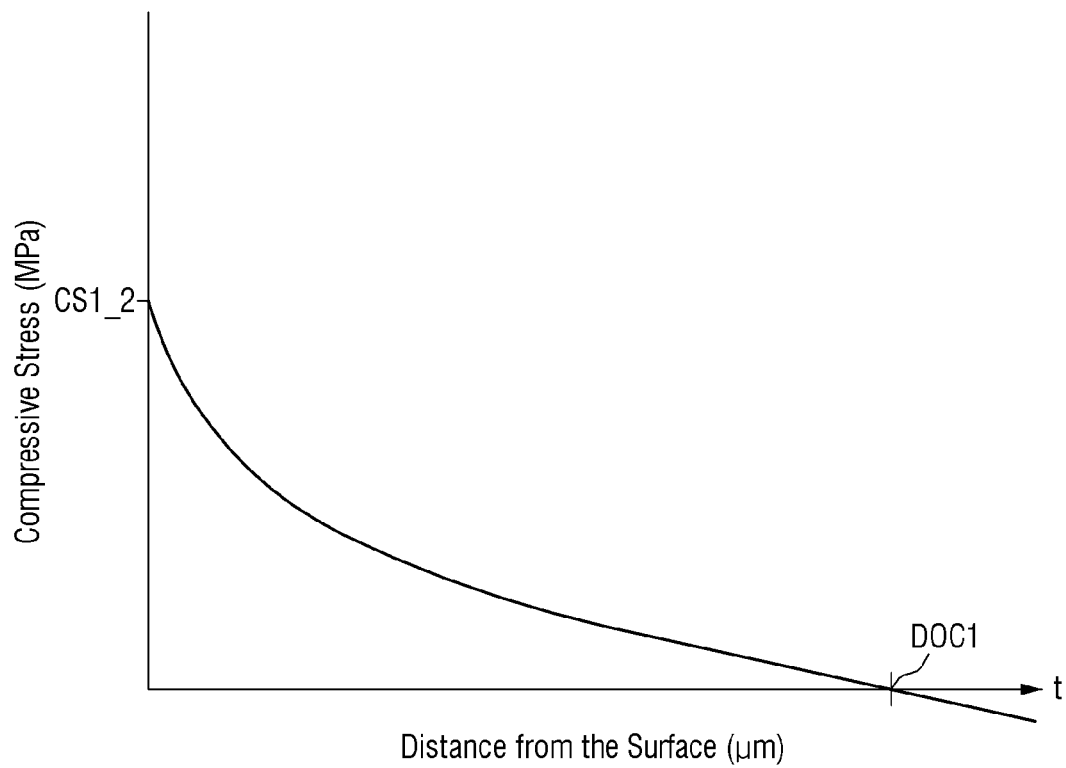
FIG. 12 is a graph showing the stress profile of the glass article that has undergone the second strengthening operation.
Figure 13:
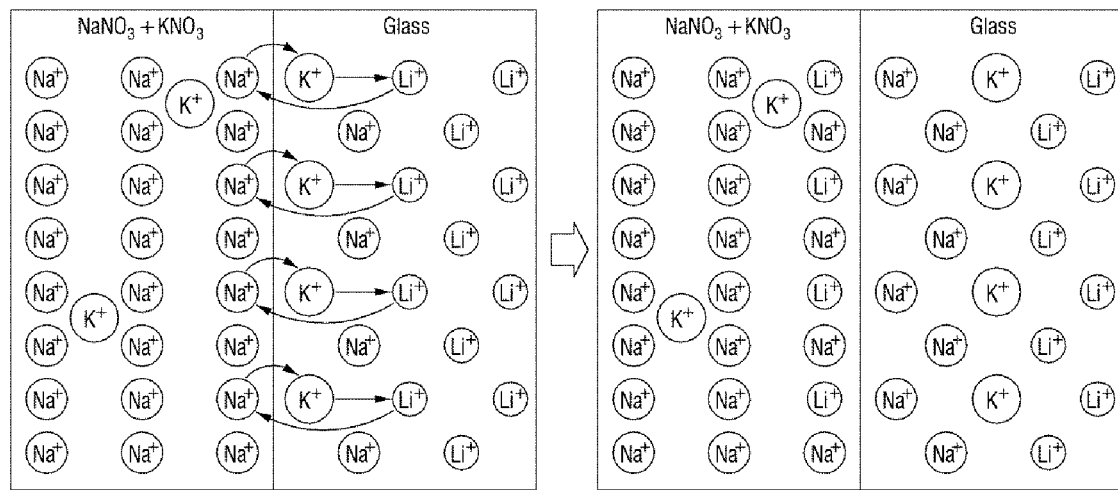
FIG. 13 is a schematic diagram illustrating an exemplary embodiment of an ion exchange process of a third strengthening operation in a method for manufacturing a glass article.
Figure 14:
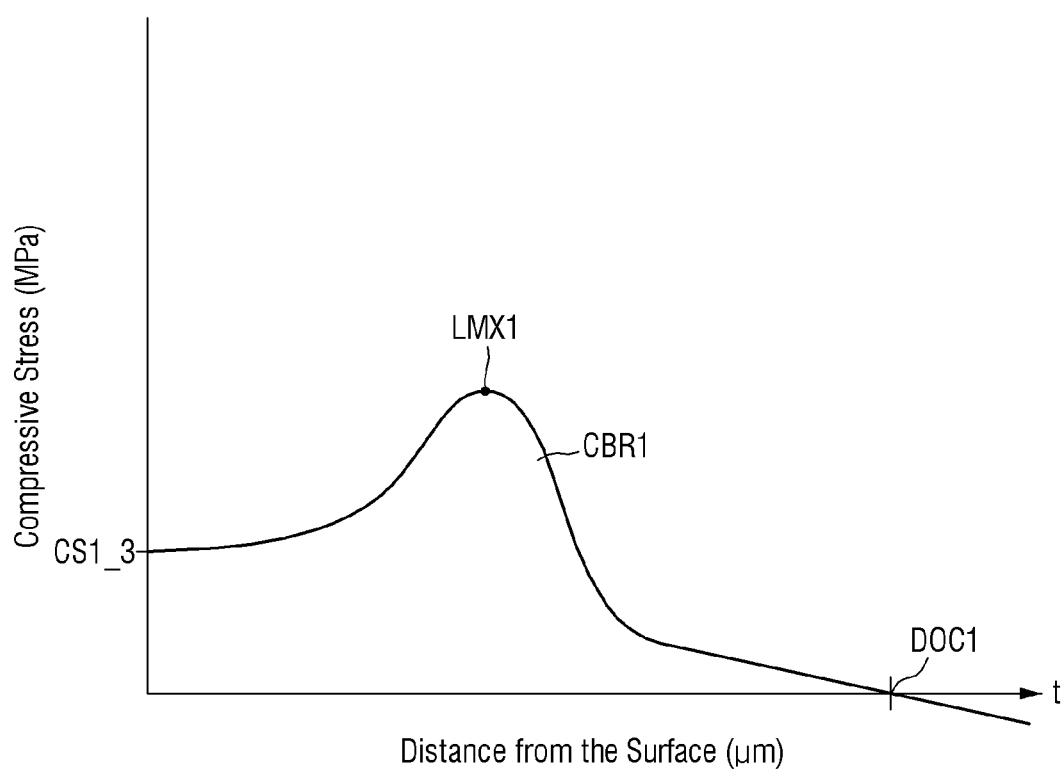
FIG. 14 is a graph showing the stress profile of the glass article that has undergone the third strengthening operation.
Figure 15:
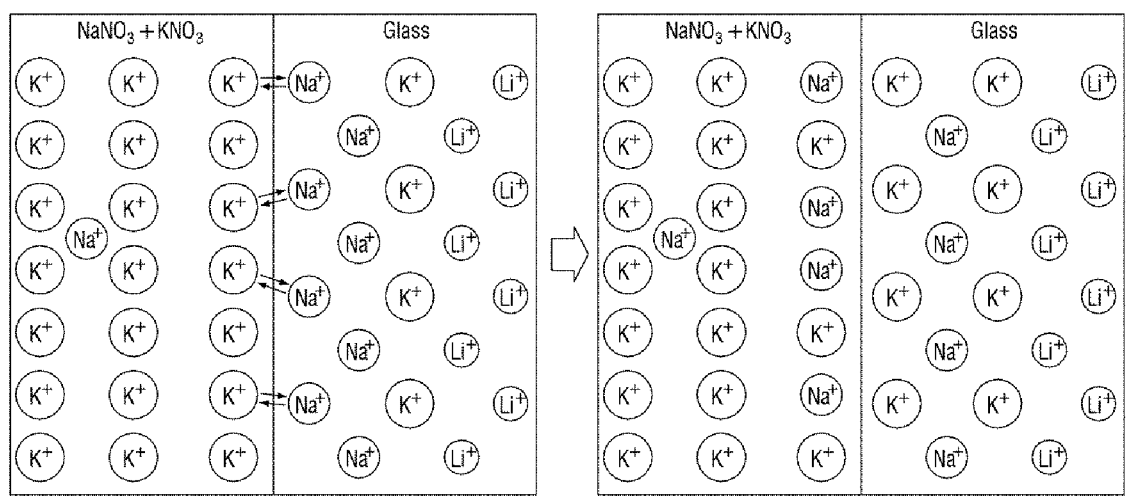
FIG. 15 is a schematic diagram illustrating an exemplary embodiment of an ion exchange process of a fourth strengthening operation in a method for manufacturing a glass article.

FIG. 8 is a flowchart of an exemplary embodiment of a method for manufacturing a glass article. FIG. 9 is a schematic diagram illustrating an ion exchange process of a first strengthening operation in a method for manufacturing a glass article. FIG. 10 is a graph showing an exemplary embodiment of the stress profile of the glass article that has undergone the first strengthening operation. FIG. 11 is a schematic diagram illustrating an exemplary embodiment of an ion exchange process of a second strengthening operation in a method for manufacturing a glass article. FIG. 12 is a graph showing the stress profile of the glass article that has undergone the second strengthening operation. FIG. 13 is a schematic diagram illustrating an exemplary embodiment of an ion exchange process of a third strengthening operation in a method for manufacturing a glass article. FIG. 14 is a graph showing the stress profile of the glass article that has undergone the third strengthening operation. FIG. 15 is a schematic diagram illustrating an exemplary embodiment of an ion exchange process of a fourth strengthening operation in a method for manufacturing a glass article.

Referring to FIGS. 8 to 15, an exemplary embodiment of a method for manufacturing the glass article 100 may include providing LAS-based glass (operation S11), a first strengthening operation of immersing the LAS-based glass in molten salt ($NaNO_3 + KNO_3$/Na: 55 to 65 mol %, K: 35 to 45 mol %) at a temperature of 380° C. to 400° C. for 20 minutes to 40 minutes (operation S12), a second strengthening operation of immersing the glass having undergone the first strengthening operation in molten salt ($NaNO_3 + KNO_3$/Na: 30 to 40 mol %, K: 60 to 70 mol %) at a temperature of 380° C. to 400° C. for 50 minutes to 70 minutes (operation S13), a third strengthening operation of immersing the glass having undergone the second strengthening operation in molten salt ($NaNO_3 + KNO_3$/Na: 85 to 95 mol %, K: 5 to 15 mol %) at a temperature of 400° C. to 420° C. for 230 minutes to 250 minutes (operation S14), and a fourth strengthening operation of immersing the glass having undergone the third strengthening operation in molten salt ($NaNO_3 + KNO_3$/Na: 2 to 8 mol %, K: 92 to 98 mol %) at a temperature of 370° C. to 390° C. for 20 minutes to 40 minutes (operation S15).

The operation S11 of providing LAS-based glass may include preparing a glass composition and molding the glass composition.

The glass composition may include various compositions known in the art. In an exemplary embodiment, the glass composition may include LAS glass ceramics including lithium aluminosilicate. In an exemplary embodiment, the glass composition may include 50 to 80 mol % of $SiO_2$, 1 to 30 mol % of $Al_2O_3$, 0 to 5 mol % of $B_2O_3$, 0 to 4 mol % of $P_2O_5$, 3 to 20 mol % of $Li_2O$, 0 to 20 mol % of $Na_2O$, 0 to 10 mol % of $K_2O$, 3 to 20 mol % of MgO, 0 to 20 mol % of CaO, 0 to 20 mol % of SrO, 0 to 15 mol % of BaO, 0 to 10 mol % of ZnO, 0 to 1 mol % of $TiO_2$, and 0 to 8 mol % of $ZrO_2$, for example.

The term "the content is 0 mol %" as used herein means that it does not substantially include the corresponding component. The term "(composition) does not substantially include (a certain component)" as used herein means that the certain component is not intentionally included in raw materials and the like, and includes, for example, a case in which a tiny amount (e.g., 0.1 mol % or less) of impurities are inevitably included.

The glass composition may further include components such as $Y_2O_3$, $La_2O_3$, $Nb_2O_5$, $Ta_2O_5$ and $Gd_2O_3$ in addition to the components mentioned above. The composition of the glass article 100 may be changed through a molding process, an ion exchange process, and the like, which will be described later.

In general, the viscosity of the glass composition varies with temperature, and the temperature at which the glass composition has a viscosity of 1014.5 poise is defined as a strain point. As the strain point increases, the scratch resistance of glass improves. However, when the strain point excessively increases, the elasticity decreases, which may disadvantageously affect product conformity. Therefore, it is preferable to use a glass composition having a strain point in an appropriate range. In an exemplary embodiment, the strain point of the glass composition may be in the range of about 505° C. to about 574° C.

The glass composition described above may be molded into a plate glass shape by various methods known in the art. In an exemplary embodiment, it may be molded by a float process, a fusion draw process, a slot draw process, or the like, for example.

Referring to FIGS. 8, 9 and 10, in the first strengthening operation S12 of immersing the LAS-based glass in molten salt ($NaNO_3$+$KNO_3$/Na: 55 to 65 mol %, K: 35 to 45 mol %) at a temperature of 380° C. to 400° C. for 20 minutes to 40 minutes, a first ion exchange process may be performed. Specifically, the first ion exchange process is a process of imparting the compression depths DOC1 and DOC2 to the glass, and may be performed generally by exposing the glass to mixed molten salt including potassium ions and sodium ions. In an exemplary embodiment, for the first ion exchange process, the glass is immersed in a bath including mixed molten salt in which sodium nitrate and potassium nitrate are mixed, for example. The ratio of sodium ions to potassium ions in the bath may be adjusted in the range of 55 to 65 mol % of Na and 35 to 45 mol % of K. In an exemplary embodiment, the ratio of sodium ions to potassium ions in the mixed molten salt of the first ion exchange process may be 60:40, but is not limited thereto.

The first ion exchange process may be performed for 20 minutes to 40 minutes at a temperature range of about 380° C. to about 400° C. In an exemplary embodiment, the first ion exchange process may be performed at a temperature of 390° C. for 30 minutes, but is not limited thereto.

Through the first ion exchange process, lithium ions/sodium ions which are small ions inside the glass are exchanged with sodium ions/potassium ions which are larger ions in the molten salt, thereby increasing the concentration of sodium ions and/or potassium ions in the glass. The main ions exchanged through the first ion exchange process may be lithium ions inside the glass and sodium ions of the mixed molten salt. Since the molten salt is provided with lithium ions from the glass, the molten salt of the bath after the first ion exchange process may further include lithium ions in addition to sodium ions and potassium ions.

Upon completion of the first ion exchange process, a stress profile corresponding to the fifth straight line l5 may be generated. That is, sodium ions and/or potassium ions of the mixed molten salt are exchanged to penetrate into the glass, and then diffuse in the depth direction. Sodium ions generally diffuse to the first compression depth DOC1 to form the first compressive region CSR1 having a compressive stress from the first surface US to the first compressive depth DOC1. That is, the first compression depth DOC1 is determined by the first ion exchange process.

The density of diffusing ions may be substantially inversely proportional to the diffusion distance. Since sodium ions and potassium ions enter the glass through ion exchange from the surface of the glass and diffuse in the depth direction, the concentration of sodium ions and potassium ions tends to substantially linearly decrease as being farther from the first surface US of the glass. As a result, the stress profile has the largest stress CS1_1 at the first surface US of the glass and decreases in the depth direction.

In addition, the degree of diffusion of ions is inversely proportional to the size of ions. In other words, as the size of ions is smaller, more ions may diffuse. Therefore, when both sodium ions and potassium ions penetrate into the glass through the first ion exchange process, sodium ions having a relatively small size may diffuse more readily and penetrate to a deeper level. Sodium ions diffuse to the first compression depth DOC1, while potassium ions may diffuse to a smaller depth. However, as described above, since main ions penetrating into the glass through the first ion exchange process are sodium ions, the stress profile of the glass that has undergone the first ion exchange process may approximate to the density profile of sodium ions.

As discussed above, the first compression depth DOC1 has a close correlation with the maximum diffusion depth of sodium ions, which are smaller ions that are ion-exchanged. The first compression depth DOC1 may be the same as the maximum diffusion depth of sodium ions, or may be provided in the vicinity thereof even though there is a slight difference, and may be generally proportional to the maximum diffusion depth of sodium ions. As described above, the first ion exchange process is a process of forming a predetermined first compression depth DOC1 through sufficient diffusion, and is performed for a sufficiently long time such that ions may be sufficiently diffused.

Referring to FIGS. 8, 11 and 12, in the second strengthening operation S13 of immersing the glass having undergone the first strengthening operation in molten salt ($NaNO_3$+$KNO_3$/Na: 30 to 40 mol %, K: 60 to 70 mol %) at a temperature of 380° C. to 400° C. for 50 minutes to 70 minutes, a second ion exchange process may be performed. Specifically, the second ion exchange process is a process of increasing the surface compressive stress CS1 of the glass article 100, and is generally performed by exposing it to mixed molten salt including potassium ions and sodium ions. In an exemplary embodiment, for the second ion exchange process, the glass that has undergone the first ion exchange process is immersed in a bath including mixed molten salt in which potassium nitrate and sodium nitrate are mixed, for example. Even when the mixed molten salt is used, a salt ratio is adjusted such that main ions penetrating into the glass are potassium ions. That is, the content of potassium nitrate in the bath is greater than that in the first ion exchange process, and furthermore, the concentration of potassium nitrate may be greater than that of sodium nitrate. In an exemplary embodiment, the salt ratio of potassium nitrate to sodium nitrate in the bath may be adjusted in the range of 60:40 to 70:30, for example. In an exemplary embodiment, the salt ratio of potassium nitrate to sodium nitrate in the mixed molten salt of the second ion exchange process may be 65:35, but is not limited thereto.

The second ion exchange process may be performed for a longer time at the same temperature as the first ion exchange process. In an exemplary embodiment, the second ion exchange process may be performed for 50 minutes to 70 minutes at a temperature range of about 380° C. to about 400° C., for example. In an exemplary embodiment, the second ion exchange process may be performed at a temperature of 390° C. for 60 minutes, but is not limited thereto.

Through the second ion exchange process, it is possible to significantly increase the compressive stress in a shallow depth section of the first surface US. The main ions exchanged through the second ion exchange process may be sodium ions of the glass and potassium ions of the mixed molten salt. When potassium ions penetrate into the glass, the compressive stress in the corresponding portion becomes larger due to the potassium ions having a larger size. Potassium ions which penetrate into the glass diffuse in the depth direction. Compared with the first ion exchange process, potassium ions have a slower diffusion rate than sodium ions, and the duration of the second ion exchange process is shorter than that of the first ion exchange process. Accordingly, the diffusion depth of potassium ions diffused through the second ion exchange process may be smaller than the first compression depth DOC1.

The compressive stress CS1_1 of the first surface US is increased to compressive stress CS1_2 through the second ion exchange process, while the penetration depth (or the first transition point TP1) of potassium ions is smaller than the first compression depth DOC1. Thus, the compressive stress profile of the glass that has undergone the second ion exchange process may have a sharp slope in the vicinity of the surface of the glass article 100 such that the slope becomes gentle as being closer to the inside of the glass article 100.

Referring to FIGS. 8, 13 and 14, in the third strengthening operation S14 of immersing the glass having undergone the second strengthening operation in molten salt ($NaNO_3$+ $KNO_3$/Na: 85 to 95 mol %, K: 5 to 15 mol %) at a temperature of 400° C. to 420° C. for 230 minutes to 250 minutes, a third ion exchange process may be performed. Specifically, the third ion exchange process is a process of diffusing potassium ions penetrated into the glass through the second ion exchange process in the depth direction of the glass article 100, and is generally performed by exposing the glass to mixed molten salt including potassium ions and sodium ions. In an exemplary embodiment, for the third ion exchange process, the glass is immersed in a bath including mixed molten salt in which sodium nitrate and potassium nitrate are mixed, for example. The ratio of sodium ions to potassium ions in the bath may be adjusted in the range of 85 to 95 mol % of Na and 5 to 15 mol % of K. In an exemplary embodiment, the ratio of sodium ions to potassium ions in the mixed molten salt of the third ion exchange process may be 90:10, but is not limited thereto.

The third ion exchange process may be performed for 230 minutes to 250 minutes at a temperature range of about 400° C. to about 420° C. In an exemplary embodiment, the third ion exchange process may be performed at a temperature of 410° C. for 240 minutes, but is not limited thereto.

Since the third ion exchange process is performed for a longer time at a higher temperature than those of the other operations, in the glass article 100 during the third ion exchange process, ion exchange with the outside of the glass and ion diffusion into the glass may be actively performed.

Potassium ions penetrated into the glass through the second ion exchange process may be diffused in the depth direction of the glass article 100 through the third ion exchange process. As the potassium ions diffuse in the depth direction of the glass article 100, lithium ions/sodium ions relatively distributed inside the glass may move toward the first surface US. In addition, the lithium ions moved toward the first surface US may be exchanged with sodium ions of the mixed molten salt. That is, through the third ion exchange process, potassium ions may move in the depth direction of the glass, and lithium ions inside the glass may move toward the first surface US to be exchanged with sodium ions of the mixed molten salt.

Through the third ion exchange process, sodium ions in the mixed molten salt may be relatively exchanged with lithium ions inside the glass, thereby increasing the concentration of sodium ions in the glass. Since the molten salt is provided with lithium ions from the glass article 100, the molten salt of the bath after the third ion exchange process may further include lithium ions in addition to sodium ions and potassium ions.

Potassium ions diffuse in the depth direction from the surface of the glass, while sodium ions penetrate from the mixed molten salt into the first surface US. Thus, the concentration of potassium ions may tend to substantially linearly decrease, increase and decrease again as being farther from the first surface US. Accordingly, when the third ion exchange process is completed, regions corresponding to the crack prevention zones CBR1 and CBR2 of FIG. 4 may be generated in the stress profile.

That is, the first crack prevention zone CBR1 may be generated such that the stress profile has the highest stress at the first local maximum point LMX1 and decreases in the depth direction and/or the direction toward the surface. The stress profile in the first crack prevention zone CBR1 may include a stress profile in which the stress decreases toward the first surface US from the first local maximum point LMX1 and a stress profile in which the stress decreases in the depth direction of the glass. In this manner, the third ion exchange process is performed for a sufficiently long time to allow the ions to diffuse sufficiently.

As more ion diffusion is performed, the maximum compressive stress CST may become smaller. The maximum compressive stress CS1 increases as the density of ions increases. Thus, when the same amount of ions enter the glass, the more the diffusion, the smaller the density and the smaller the compressive stress. As described above, since the third strengthening operation has limitations in increasing the maximum compressive stress CS1_3 of the first surface US, a fourth ion exchange process is further performed after the third strengthening operation in order to form a greater surface compressive stress CS1_3.

Referring to FIGS. 5, 8 and 15, in the fourth strengthening operation S15 of immersing the glass having undergone the third strengthening operation in molten salt ($NaNO_3$+$KNO_3$/Na: 2 to 8 mol %, K: 92 to 98 mol %) at a temperature of 370° C. to 390° C. for 20 minutes to 40 minutes, a fourth ion exchange process may be performed. Specifically, the fourth ion exchange process is a process of increasing the maximum compressive stress CS1, and is generally performed by exposing the glass to single molten salt including potassium ions or mixed molten salt including potassium ions and sodium ions. In an exemplary embodiment, for the fourth ion exchange process, the glass that has undergone the third ion exchange process is immersed in a bath including single molten salt including potassium nitrate or mixed molten salt in which potassium nitrate and sodium nitrate are mixed, for example. Even when the mixed molten salt is used, a salt ratio is adjusted such that main ions penetrating into the glass are potassium ions. The concentration of potassium nitrate in the bath may be greater than that of sodium nitrate in the bath. In an exemplary embodiment, the salt ratio of potassium nitrate to sodium nitrate in the bath may be adjusted in the range of 92:8 to 98:2, for example. In an exemplary embodiment, the salt ratio of potassium nitrate to sodium nitrate in the mixed molten salt of the fourth ion exchange process may be 95:5, but is not limited thereto.

The fourth ion exchange process may be performed at a lower temperature and for a shorter time than the third ion exchange process. In an exemplary embodiment, the fourth ion exchange process may be performed for about 20 minutes to about 40 minutes at a temperature range of 370° C. to 390° C., for example.

Through the fourth ion exchange process, it is possible to significantly increase the compressive stress in a shallow depth section of the first surface US. Specifically, when potassium ions penetrate into the glass, the compressive stress in the corresponding portion becomes larger due to the potassium ions having a larger size. Potassium ions which penetrate into the glass diffuse in the depth direction. Since potassium ions have a slower diffusion rate than sodium ions, and the duration of the fourth ion exchange process is shorter than that of the third ion exchange process, the diffusion depth of potassium ions diffused through the fourth ion exchange process may be smaller than the first local minimum point LMN1. The maximum diffusion depth of potassium ions additionally penetrating through the fourth ion exchange process may be below the first transition point TP1.

The stress profile provided by the potassium ions additionally penetrated through the fourth ion exchange process has substantially the same shape as in the first segment SG1. The compressive stress CS1 of the first surface US is increased through the fourth ion exchange process, while the penetration depth (or the first transition point TP1) of the potassium ions through the fourth ion exchange process is smaller than the first local minimum point LMN1. Thus, the absolute value of the first slope $m_1$ of the first straight line l1 is greater than the absolute value of the second slope $m_2$ of the second straight line l2. That is, the compressive stress profile may have a sharp slope in the vicinity of the surface of the glass article 100.

In an exemplary embodiment of the method for manufacturing the glass article 100, it is possible to provide the glass article 100 having high strength such that it is not easily broken by an external impact by including the crack prevention zones CBR1 and CBR2 disposed in a depth section of about 30 μm to about 70 μm from the first surface US and having a higher stress than the surroundings.

In concluding the detailed description, those skilled in the art will appreciate that many variations and modifications may be made to the preferred embodiments without substantially departing from the principles of the invention. Therefore, the disclosed preferred embodiments of the invention are used in a generic and descriptive sense only and not for purposes of limitation.

What is claimed is:

1. A glass article including lithium aluminosilicate, comprising:
   a first surface;
   a second surface opposed to the first surface;
   a first compressive region extending from the first surface to a first compression depth;
   a second compressive region extending from the second surface to a second compression depth; and
   a tensile region disposed between the first compression depth and the second compression depth,
   wherein a stress profile of the first compressive region includes a crack prevention zone including a peak, the crack prevention zone being disposed in a depth range of 30 micrometers to 70 micrometers,
   wherein the peak of the crack prevention zone has a maximum value in the depth range,
   a depth of the peak of the crack prevention zone has a value of 40 micrometers or more,
   a stress profile of the first compressive region has a first local minimum point at which the stress profile is convex downward,
   a depth of the first local minimum point is 0.24 times to 0.31 times the first compression depth, and
   the first compression depth ranges from 105 micrometers to 115 micrometers.

2. The glass article of claim 1, wherein a maximum stress in the crack prevention zone ranges from 262.2 Megapascals to 481.2 Megapascals.

3. The glass article of claim 1, wherein the crack prevention zone includes a plurality of peaks.

4. An electronic device comprising a glass article including lithium aluminosilicate, comprising:
   a first surface;
   a second surface opposed to the first surface;
   a first compressive region extending from the first surface to a first compression depth;
   a second compressive region extending from the second surface to a second compression depth; and
   a tensile region disposed between the first compression depth and the second compression depth,
   wherein a stress profile of the first compressive region includes a crack prevention zone including a peak, the crack prevention zone being disposed in a depth range of 30 micrometers to 70 micrometers,
   wherein the peak of the crack prevention zone has a maximum value in the depth range,
   a depth of the peak of the crack prevention zone has a value of 40 micrometers or more,
   a stress profile of the first compressive region has a first local minimum point at which the stress profile is convex downward,
   a depth of the first local minimum point is 0.24 times to 0.31 times the first compression depth, and
   the first compression depth ranges from 105 micrometers to 115 micrometers.

* * * * *